United States Patent [19]

Heim et al.

[11] Patent Number: 5,420,736
[45] Date of Patent: May 30, 1995

[54] MR READ TRANSDUCER WITH THERMAL NOISE CANCELLATION

[75] Inventors: David E. Heim, Redwood City; Po-Kang Wang, San Jose, both of Calif.

[73] Assignee: International Business Machines Corporation, Armonk, N.Y.

[21] Appl. No.: 228,046

[22] Filed: Apr. 15, 1994

[51] Int. Cl.$^6$ .................................. G11B 5/127
[52] U.S. Cl. ........................................ 360/113
[58] Field of Search ................................ 360/113

[56] References Cited

U.S. PATENT DOCUMENTS

| | | | |
|---|---|---|---|
| 3,813,692 | 5/1974 | Brock et al. | 360/113 |
| 3,814,863 | 6/1974 | O'Day et al. | 360/113 |
| 4,555,740 | 11/1985 | Jackson et al. | 360/113 |
| 4,802,043 | 1/1989 | Sato | 360/113 |
| 4,924,334 | 5/1990 | Diepers et al. | 360/77.07 |
| 5,018,037 | 5/1991 | Krounbi et al. | 360/113 |
| 5,065,094 | 11/1991 | Mowry | 324/207.21 |
| 5,079,035 | 1/1992 | Krounbi et al. | 427/130 |
| 5,375,022 | 12/1994 | Gill | 360/113 |

OTHER PUBLICATIONS

The Barber Pole, A Linear Magnetoresistive Head, K. E. Kuijk, W. J. van Gestel and F. W. Gorter, IEEE Transactions on Magnetics, vol. Mag-11, No. 5, Sep., 1975, pp. 1215-1217.

The Design of Magnetoresistive Multitrack READ Heads for Magnetic Tapes, Werner Metzdorf, M. Boehner and H. Haudek, IEEE Transactions on Magnetics, vol. Mag-18, No. 2, Mar., 1982, pp. 763-768.

Primary Examiner—A. J. Heinz
Attorney, Agent, or Firm—Baker, Maxham, Jester & Meador

[57] ABSTRACT

Three leads L1, L2, and L3 connected to an MR stripe of an MR read transducer are arranged in a circuit for eliminating: (1) thermal asperity noise, (2) damage from shorting from the transducer to a magnetic medium, and (3) signal reduction from shorting between the conductive layers of the transducer at the ABS. The first and second leads L1 and L2 are connected to the MR stripe adjacent its top edge and the third lead L3 is connected to the MR stripe adjacent its bottom edge, the bottom edge being at the ABS of the transducer. A current of equal magnitude is applied to each of the first and second leads to flow at an angle from each of these leads to the third lead L3, this angle being preferably 45° to the longitudinal axis or ABS of the MR stripe. A differential preamplifier is connected across the first and second leads L1 and L2. With this arrangement, thermal asperity noise is cancelled by common mode rejection at the differential preamplifier. The third lead L3 and the support device for a magnetic medium are grounded to prevent sensor damage from shorting between these components. The third lead also electrically interconnects the MR stripe to one of the shield layers S1 or S2 and both shield layers are grounded to prevent signal loss from shorting between these conductive layers at the ABS.

34 Claims, 5 Drawing Sheets

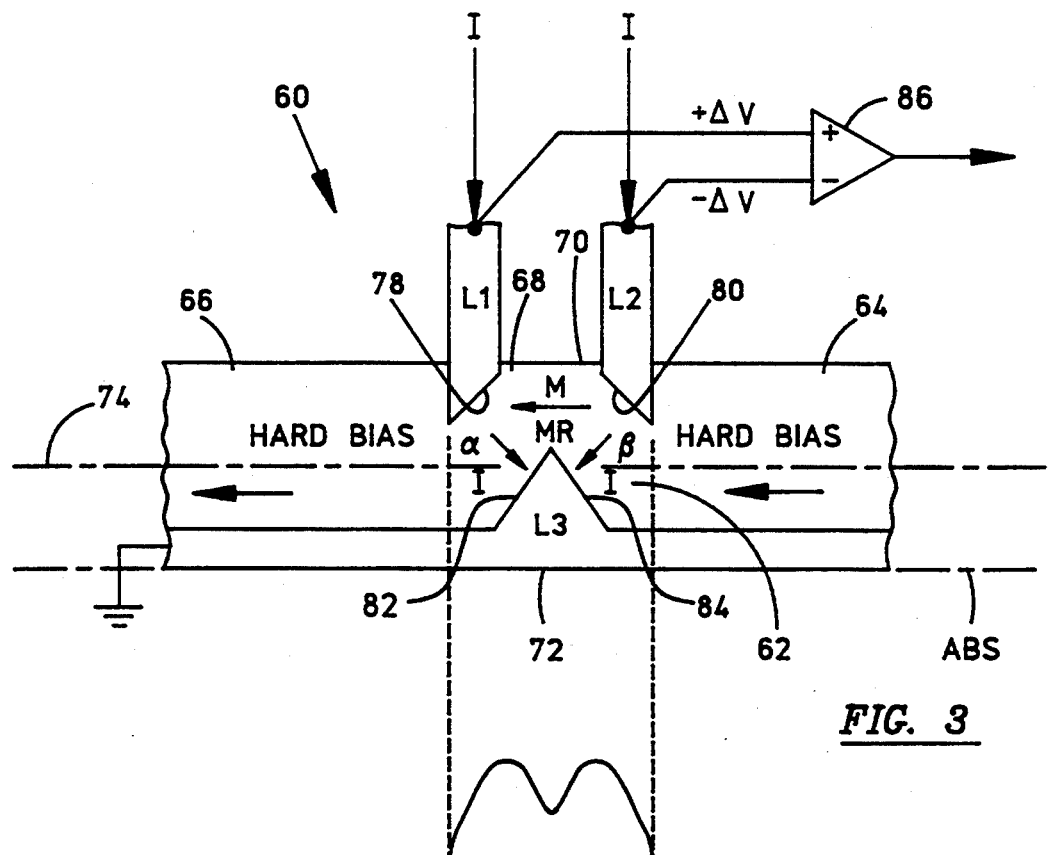
FIG. 3
FIG. 4
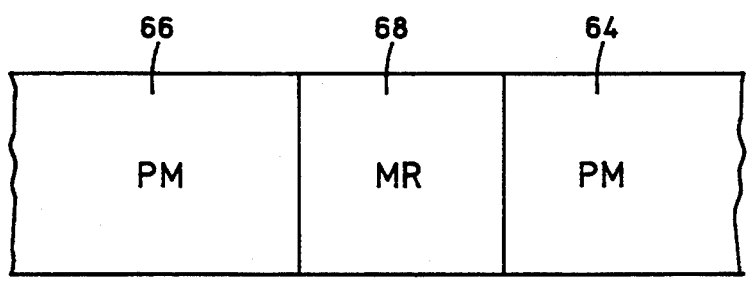
FIG. 5
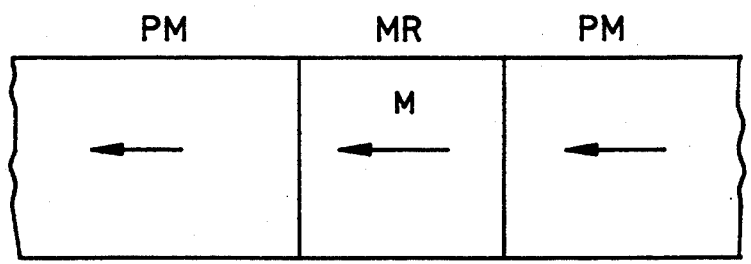
FIG. 6

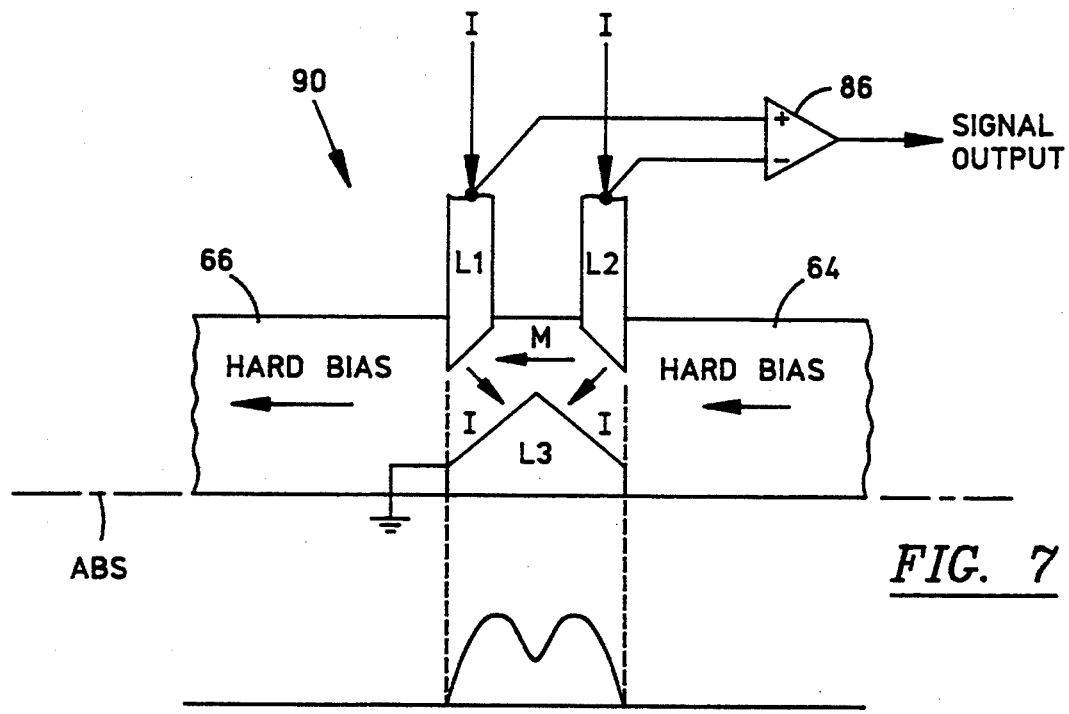
FIG. 7
FIG. 8
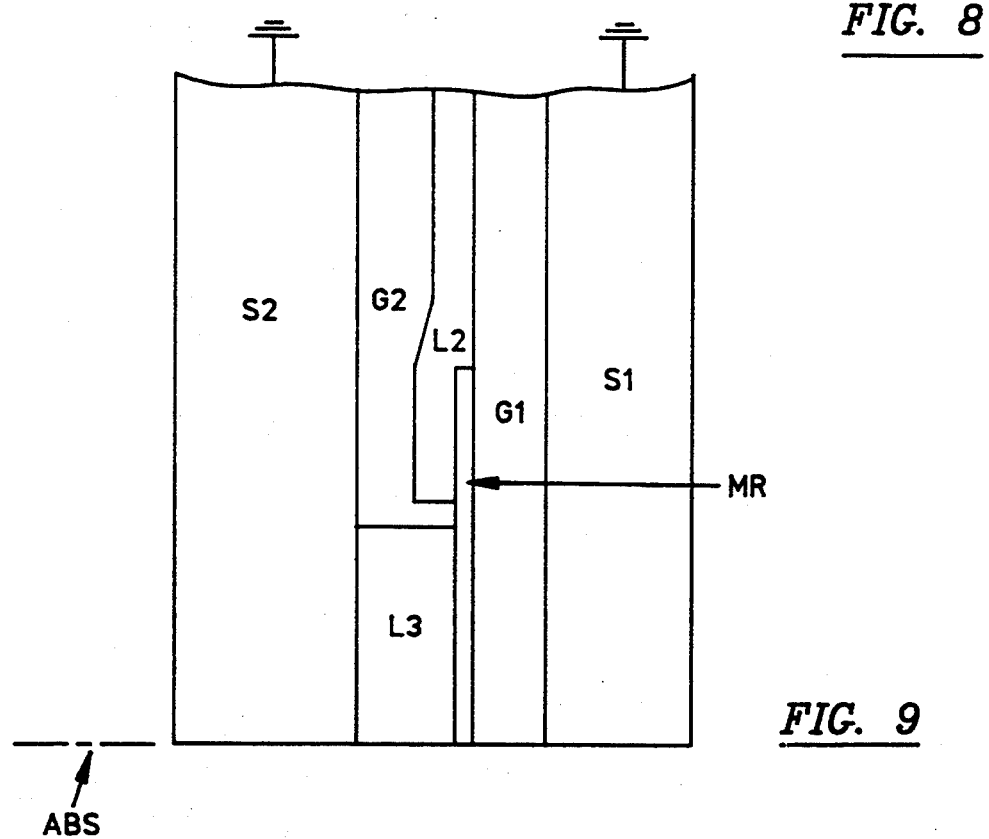
FIG. 9

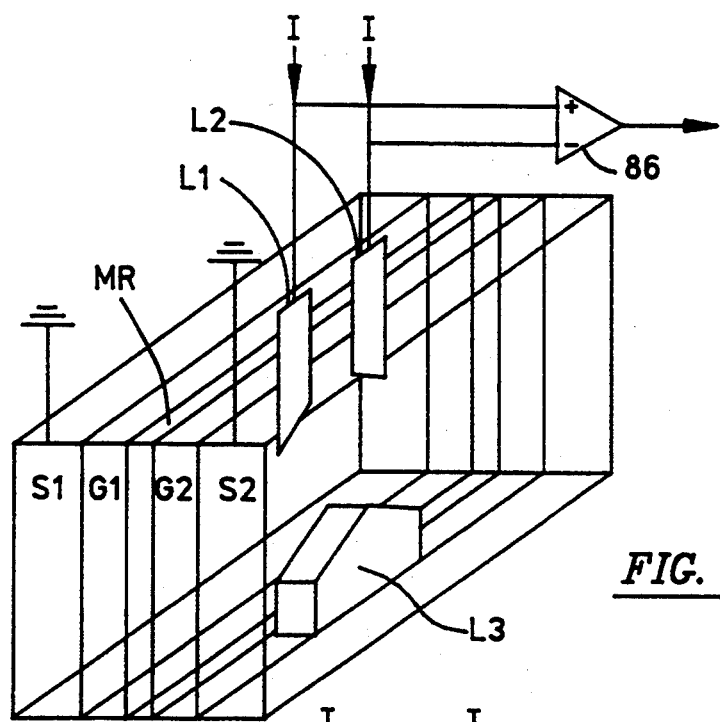
*FIG. 10*
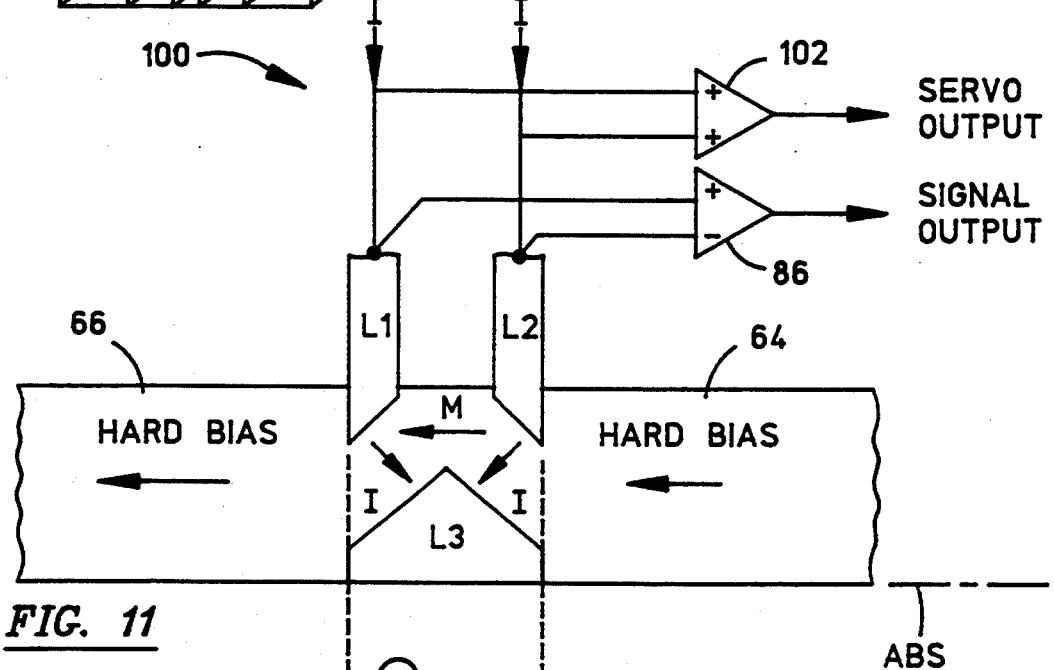
*FIG. 11*
*FIG. 12*
*FIG. 13*

LAPPING

MR READ TRANSDUCER WITH THERMAL NOISE CANCELLATION

BACKGROUND OF THE INVENTION

1. Field of the Invention

The present invention relates a thin film magnetoresistive (MR) read transducer and, more particularly, to an arrangement of leads for an MR read transducer which enables cancellation of thermal asperity noise upon contact of the transducer with moving magnetic media.

2. Description of the Related Art

An MR read transducer employs an MR stripe or layer which changes resistance in response to magnetic flux incursions from a moving magnetic medium, such as a rotating magnetic disk. A sense current, which is passed through the MR stripe, varies proportionately with changes in resistance of the MR stripe. The response of the MR stripe is based on how well the resistance change follows the change in flux density sensed from the magnetic medium.

In a conventional read head configuration, the MR stripe is a thin film layer which is sandwiched between bottom and top insulation layers G1 and G2 which, in turn, are sandwiched between bottom and top shield layers S1 and S2. The distance between the shield layers is called the "read gap". The smaller the read gap, the greater the resolution of the MR read transducer. The MR read transducer has considerable promise for handling the high data rates being developed by present technology.

One of the problems encountered with MR read transducers is that large signal transients are generated in an MR stripe by contact of the transducer with asperities on the magnetic medium. This is referred to as "thermal asperity noise". When the transducer contacts asperities on a rotating disk, for example, heat is generated within the MR stripe, which changes its resistance to produce a large signal transient. In a disk drive, such signal transients are reflected as noise when the readback signal generated by the transducer is amplified.

Another problem with MR read transducers is that electrical shorting can occur between an air bearing surface (ABS) of the transducer and the magnetic storage medium. If the ABS of the transducer is not at the same potential as the medium, then on contact between the two a current flows between the sensor and medium. The likelihood of a short is increased by contact or near-contact with the storage medium. In the event of a single short, the MR read transducer can be severely damaged, rendering it inoperable. The higher the potential difference between the MR read transducer and the medium, the greater the risk of damage to the transducer.

Still another problem of an MR read transducer is that shorting may occur between the shields S1 and S2 and the MR stripe when the shields are constructed of NiFe. The shorting occurs during head-disk contact during operation when the NiFe from the shields, which is conductive, is smeared across the ABS. This renders the head inoperable unless the portion of the MR stripe exposed at the ABS is at or nearly at an equipotential. The prior art overcomes this problem by constructing the shields of Sendust, which is resistant to smearing. Sendust requires high temperature processing, which has been shown to greatly increase stress in the substrate, thereby requiring much tighter control of the MR stripe magnetostriction. Sendust also introduces noise during quasistatic testing of the MR read transducer. On the other hand, NiFe requires relatively simple processing steps, is easy to incorporate into a head manufacturing process, and would be preferable to Sendust, with a solution to the shorting problem.

SUMMARY OF THE INVENTION

The present invention provides an MR read transducer which solves all three of the aforementioned prior art problems, namely, (1) thermal asperity noise, (2) electrical shorting between the ABS of the MR read transducer and a moving magnetic medium, and (3) electrical shorting between the shield layers and the MR stripe layer. The invention provides three leads which are connected to the MR stripe of the MR read transducer. Two of the leads are connected along a top edge of the MR stripe in a spaced-apart relationship and the third lead is connected to the MR stripe along its bottom edge. Each of the first and second leads has a straight edge and the third lead has first and second straight edges. All of the edges of the leads are spaced from one another within the boundary of one of the film surfaces of the MR stripe. The straight edge of the first lead and the first straight edge of the third lead face one another along an angle $\alpha$ to the longitudinal axis of the MR stripe. The straight edge of the second lead and the second straight edge of the third lead face one another along an angle $\beta$ to the longitudinal axis of the MR stripe. The angles $\alpha$ and $\beta$ are preferably equal and approximately at 45° to the longitudinal axis of the MR stripe. An identical current is applied to each of the first and second leads, while the third lead along the bottom edge of the MR stripe is grounded. In a quiescent state, a current flows from the first lead to the third lead and a current flows from the second lead to the third lead, these currents being equal with respect to one another.

The problem of thermal asperity noise is overcome by connecting a differential preamplifier across the first and second leads. When the MR stripe increases in temperature due to contact with the magnetic medium, it will affect both currents equally, which will be cancelled by common mode rejection at the differential preamplifier. The second problem of electrical shorting between the MR read transducer and the magnetic medium is overcome by grounding the magnetic medium through its support device. In a magnetic disk drive, the spindle of the drive would be grounded to accomplish this objective. Since the bottom edge of the MR stripe at the ABS is also grounded, it will be at the same potential as the medium and contact between the MR read transducer and the magnetic medium has no effect. The third problem of electrical shorting between the layers of the MR read transducer at the ABS is overcome by connecting the third lead at the bottom edge of the MR stripe to one of the shield layers and grounding both shield layers. This establishes all of the conductive layers at the ABS of the MR read transducer at equipotential so that electrical shorting therebetween has no effect. With this arrangement the shield layers S1 and S2 can be constructed of NiFe, which is preferred over Sendust.

Other advantages accrue from the aforementioned arrangement of the present MR read transducer. The MR read transducer can be hard-biased along its longitudinal axis so that the MR stripe has a horizontal magnetization vector. If the aforementioned angles $\alpha$ and $\beta$ are each 45°, then the currents between the leads will each be directed at 45° to the magnetization vector when the MR stripe is in a quiescent state. This is an ideal arrangement to increase the performance of the MR read transducer. The hard-biasing establishes the MR stripe in substantially a single domain state to eliminate Barkhausen noise and the 45° angles between the currents and the magnetization vector provide a transverse biasing which linearizes the performance of the MR stripe.

Another advantage of the aforementioned arrangement of the present MR read transducer is that the MR stripe can be employed for recovering servo information from the same track that carries data information. This is accomplished by connecting a summing preamplifier in parallel with the differential preamplifier. When the MR read transducer is on track, the summing preamplifier will have a zero output and when it is off track, the summing preamplifier will have a positive or negative output, depending on which direction it is off track.

An object of the present invention is to provide an MR read transducer which eliminates thermal asperity noise, damage from electrical shorting between the transducer and a magnetic medium, and loss of function from electrical shorting between the conductive layers of the MR read transducer at the ABS.

Another objective is to accomplish the aforementioned objective with an MR read transducer which is highly stabilized and linearly responsive.

Still another object is to accomplish any of the aforementioned objects as well as retrieving information and servo data from the same track of a magnetic medium.

A further object is to provide an MR read transducer which eliminates thermal asperity noise by common mode rejection without a problem of electrical shorting between the transducer and a magnetic medium.

Still a further object is to accomplish the aforementioned objective without a problem of electrical shorting between the conductive layers of the MR read transducer at the ABS.

Other objects will become apparent when considered in light of the following description of the invention.

BRIEF DESCRIPTION OF THE DRAWINGS

FIG. 3 is a schematic illustration of an MR stripe with three leads connected to it.

FIG. 4 is a micro track profile of the signal response of the MR stripe of FIG. 3.

FIG. 5 is a schematic illustration of the MR stripe sandwiched between a pair of permanent magnets for accomplishing the hard-biasing arrangement shown in FIG. 3.

FIG. 6 is a schematic illustration of the magnetization vectors in the MR stripe and the permanent magnet layers of FIG. 5.

FIG. 7 is similar to FIG. 3, except the third lead at the ABS is connected to one of the shield layers and extends laterally only between the width of the track.

FIG. 8 is a micro track profile showing the signal response of the MR stripe of FIG. 7.

FIG. 9 is an enlarged side view of FIG. 7 illustrating the connection of one of the top leads to the top edge of the MR stripe and the bottom lead to the bottom edge of the MR stripe and one of the shield layers.

FIG. 10 is a isometric schematic illustration representing the MR stripe sandwiched between the first and second shield layers S1 and S2 with appropriate electrical connections.

FIG. 11 is similar to FIG. 7, except a summing preamplifier is connected in parallel with the differential preamplifier for retrieving servo information on the same track that carries data information.

FIG. 12 is a micro track profile showing the signal response of the MR stripe of FIG. 11 to servo information carried by the data/servo track.

FIG. 13 is a track profile showing the signal response of the MR stripe as it is moved to the right or left of the data/servo track.

DESCRIPTION OF THE PREFERRED EMBODIMENTS

Figure 1:
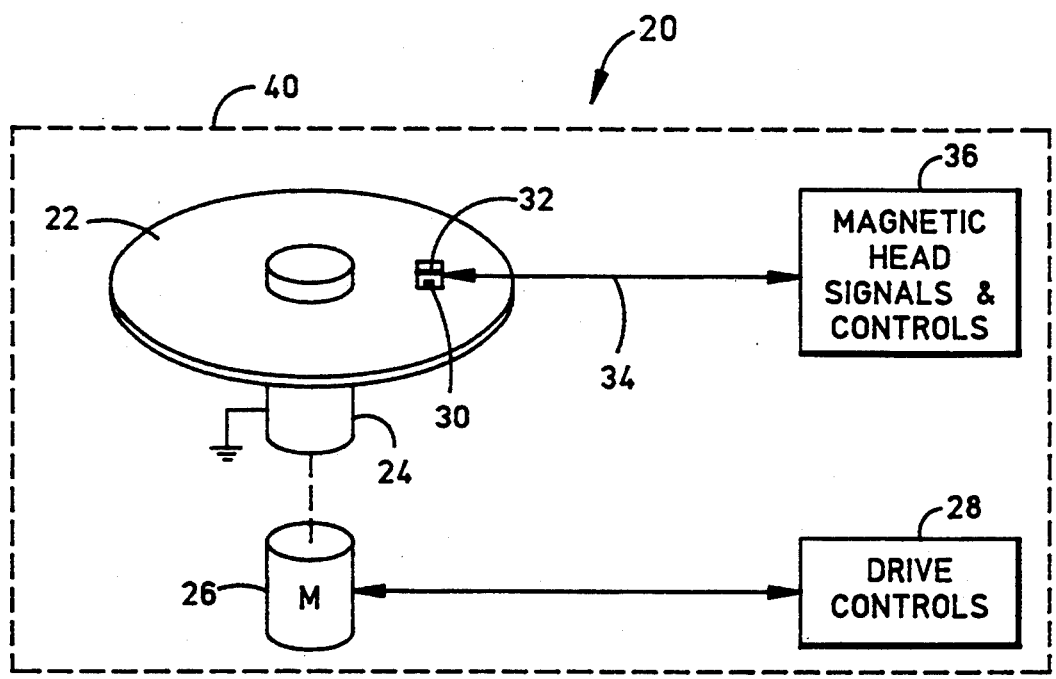
FIG. 1 is an exemplary magnetic media drive which employs the improved MR read transducer.

Referring now to the drawings, wherein like reference numerals designate like or similar parts throughout the several views, there is illustrated in FIG. 1 a magnetic disk drive 20 which includes a rotatable disk 22. The disk 22 is supported by a spindle 24 which is rotated by a motor 26, the motor 26 being controlled by drive controls 28. A thin film MR read transducer 30 is mounted on a slider 32 which in turn is supported by a suspension 34. Typically, the transducer 30 also includes a write head so that signals can be written and read from the same slider 32. The signals to and from the transducer 30 and its movements with respect to the magnetic disk 22 are controlled by magnetic head signals and controls 36. When the disk 22 is rotated, the slider 32 rides on a cushion of air (air bearing) which is generated by the movement of the disk 22. During the movement of the disk 22, the magnetic head 30 is placed in a transducing relationship with respect to a circular data track shown at 38 in FIG. 2. The bottom surfaces of the slider 32 and the transducer 30 are in a plane which is called an air bearing surface (ABS). The ABS is spaced from the surface of the disk 22 by a distance in the order of 0.075 $\mu$m when the disk is rotating. The above components are mounted within a housing 40.

Figure 2:
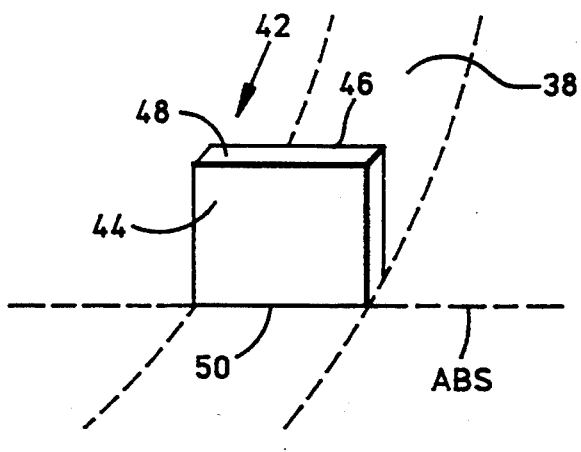
FIG. 2 is a schematic illustration of an MR stripe above a circular track of a magnetic disk.

The MR read transducer 30 includes an MR layer or stripe 42 which is shown schematically in FIG. 2 above the circular track 38. As shown in FIG. 9, the MR stripe is sandwiched between a pair of insulative gap layers G1 and G2, which in turn are sandwiched between a pair of shield layers S1 and S2. For a more detailed description of a complete structure of an MR read transducer, refer to commonly assigned patent application of Heim and Gill, Ser. No. 08/103,487, which is incorporated by reference herein. All of the layers of the MR read transducer are thin films, which are constructed by well-known frame plating and photoetching techniques. As shown in FIG. 2, the MR stripe 42 is a thin film which has first and second film surfaces 44 and 46, which are bounded in part by top and bottom edges 48 and 50, the bottom edge 50 forming a portion of the ABS of the MR read transducer.

A first embodiment of the invention 60 is shown in FIG. 3. This embodiment includes an MR layer or stripe 62 which may be located between a pair of hard-bias layers 64 and 66. The MR stripe has a film surface 68 which is bounded in part by a top edge 70 and a bottom edge 72, the bottom edge 72 comprising a portion of the ABS. The MR stripe 62 has a longitudinal axis 74 which is substantially parallel to the ABS and to its top and bottom edges 70 and 72. First and second leads L1 and L2 are connected to the film surface 68 of the MR stripe in a spaced-apart relationship and extend from the top edge 70 of the MR stripe toward the longitudinal axis 74. A third lead L3 is connected to the film surface 68 of the MR stripe and extends from the bottom edge 72 of the MR stripe toward the longitudinal axis 74. The bottom lead L3 is preferably grounded as illustrated in FIG. 3.

Each of the first and second leads L1 and L2 has a substantially straight edge 78 and 80, respectively and the third lead L3 has first and second straight edges 82 and 84. The straight edge 78 of the first lead L1 and the first straight edge 82 of the third lead L3 are spaced from one another in a substantially parallel relationship and face one another along a line which is at an angle $\alpha$ to the longitudinal axis of the MR stripe. This line is in the same direction as the arrow for current I, which will be described in more detail hereinafter. The straight edge of the second lead L2 and the second edge 84 of the third lead L3 are spaced from one another in a substantially parallel relationship and face one another along a line which is at an angle $\beta$ to the longitudinal axis 74 of the MR stripe. This line is along the arrow for another current I which will be explained in more detail hereinafter.

An identical DC current I is applied to the first and second leads L1 and L2 which causes the currents to be conducted across the MR stripe to the third lead L3 where the currents are grounded. The currents I are traditionally referred to as "sense" currents. It is important that the sense currents I be applied at the same potential with no shorting therebetween. A differential preamplifier 86 is connected across the first and second leads L1 and L2 and has no output when the currents I are conducting through the MR stripe to the third lead L3 during a quiescent state (before a magnetic medium flux incursion). The connection of the differential preamplifier 86 overcomes the problem of thermal asperity noise should the MR stripe contact a moving magnetic medium. When the MR read transducer contacts an asperity of a moving magnetic medium, such as a rotating magnetic disk, friction therebetween generates heat within the MR stripe which increases its resistance. This resistance is realized across both current flows I which will be cancelled by common mode rejection at the differential preamplifier 86.

As shown in FIGS. 3, 5, and 6, the MR stripe 62 can be hard-biased by a continuous junction engagement with the hard-bias permanent magnet layers 64 and 66. If the magnetization vectors are horizontally to the left in each of the permanent magnet layers 64 and 66, the magnetization vector in the MR stripe 62 will be horizontally to the left by exchange coupling with the permanent magnet layers 64 and 66. This same orientation of the magnetization vector within the MR stripe 62 is illustrated in FIGS. 3 and 6. Upon a north magnetic flux incursion (not shown) from a magnetic medium, such as a magnetic disk, below the ABS of the MR read transducer in FIG. 3, the magnetization vector M in FIG. 3 will be rotated clockwise. The clockwise rotation of the magnetization vector M will decrease the resistance in the MR stripe for the current I flowing between the first lead L1 to the third lead L3 and will increase the resistance to the current I flowing from the second lead L2 to the third lead L3. This will cause a potential difference between the first and second leads L1 and L2 which will be added at the differential preamplifier 86 to provide a signal output representing information retrieved from a data track of the magnetic medium such as data track 38 illustrated in FIG. 2. Upon the occurrence of a south magnetic flux incursion from magnetic media below the ABS, the same beneficial signal output will be obtained with opposite polarity. FIG. 4 represents the signal output of the differential preamplifier 86 if the width of the MR stripe between the dotted lines is scanned across an incremental magnetic flux incursion (point-source) from a magnetic medium. It can be seen that there is a dip in this profile at the center of the MR stripe where the third lead L3 comes to a peak. This is because the current will be less at this location than it is on either side thereof. If the area of the curve between the dotted lines is added by integration, the output of the differential preamplifier 86 would be produced, which would represent a magnetic flux incursion from a magnetic medium across the width of the MR stripe.

Another embodiment 90 of the invention is illustrated in FIG. 7. This embodiment is identical to the embodiment 60 shown in FIG. 3 except the width of the third lead L3 is confined to the width of the MR stripe. The advantage of the embodiment 90 over the embodiment 60 can be seen by comparison between the micro track profiles shown in FIGS. 8 and 4. In FIG. 3 some of the current I from the first and second leads L1 and L2 is conducted through the hard-bias layers 64 and 66 to the widely extending third lead L3. These conducting paths partially short the signal generated by the MR portion 62 and reduce the resultant signal. Since the third lead L3 of the embodiment 90 in FIG. 7 is restricted to the track width between the dotted lines, these conducting paths are substantially removed, thereby increasing the signal.

When the third lead L3 is connected to ground, electrical shorting can occur between the MR read transducer at the ABS and the magnetic medium which is discussed hereinabove as the second problem associated with MR read transducers. This problem is overcome by grounding the spindle 24 as shown in FIG. 1. Accordingly, when the magnetic disk 22 is supported by the spindle 24, it is likewise grounded. Since the MR read transducer is at ground at its ABS and the magnetic disk 22 is grounded by the spindle 24 (they are at the same potential), shorting between these components has no effect.

FIG. 9 shows a connection of the third lead L3 of either of the embodiments 90 or 60 to eliminate electrical shorting across the conductive layers of the MR read transducer at the ABS which is described hereinabove as the third problem associated with MR read transducers. This is accomplished by making the thickness of the third lead L3 thick enough to electrically contact both the MR stripe and one of the shield layers S1 or S2. The first and second shield layers S1 and S2 are then grounded as illustrated in FIG. 9. By this arrangement, all of the conductive layers are at equipotential at the ABS and any electrical shorting therebetween has no effect. This arrangement also maintains these conductive elements at ground, which is important for preventing electrical shorting between these conductive layers and a magnetic medium located below the ABS. This arrangement further enables the shield layers S1 and S2 to be NiFe, which is preferred over Sendust. The second lead L2 is shown connected at the top edge of the MR stripe. The first lead L1 would be connected in the same manner. An overall electrical scheme for the MR read transducer is illustrated in FIG. 10. The third lead L3 is connected between the MR stripe and the second shield layer S2 and both of the first and second shield layers S1 and S2 are grounded. The first and second leads L1 and L2 receive identical currents I at the same potential and are connected to the differential preamplifier 86.

The unique arrangement of the first, second and third leads L1, L2 and L3 enables the MR read transducer to obtain servo information in addition to data information from the same track of a magnetic medium. This is accomplished by the embodiment 100 illustrated in FIG. 11. A summing preamplifier 102 is connected across the first and second leads L1 and L2 in parallel with the differential preamplifier 86. The micro track profile for the summing preamplifier 102 is illustrated in FIG. 12. This is the output that would be realized by the preamplifier 102 if the MR stripe were scanned across an incremental magnetic flux incursion from the track of the magnetic medium. The signal response of the summing preamplifier 102 to a magnetic flux incursion across the width of the MR stripe is illustrated in FIG. 13 as the MR stripe is moved to the right or left from a center track position. This would provide the position error signal (PES) which can be employed for bringing the MR read transducer back on track. It can be seen from FIG. 13 that when the MR read transducer is at the center of the track, there is a zero position error signal response.

Figure 14:
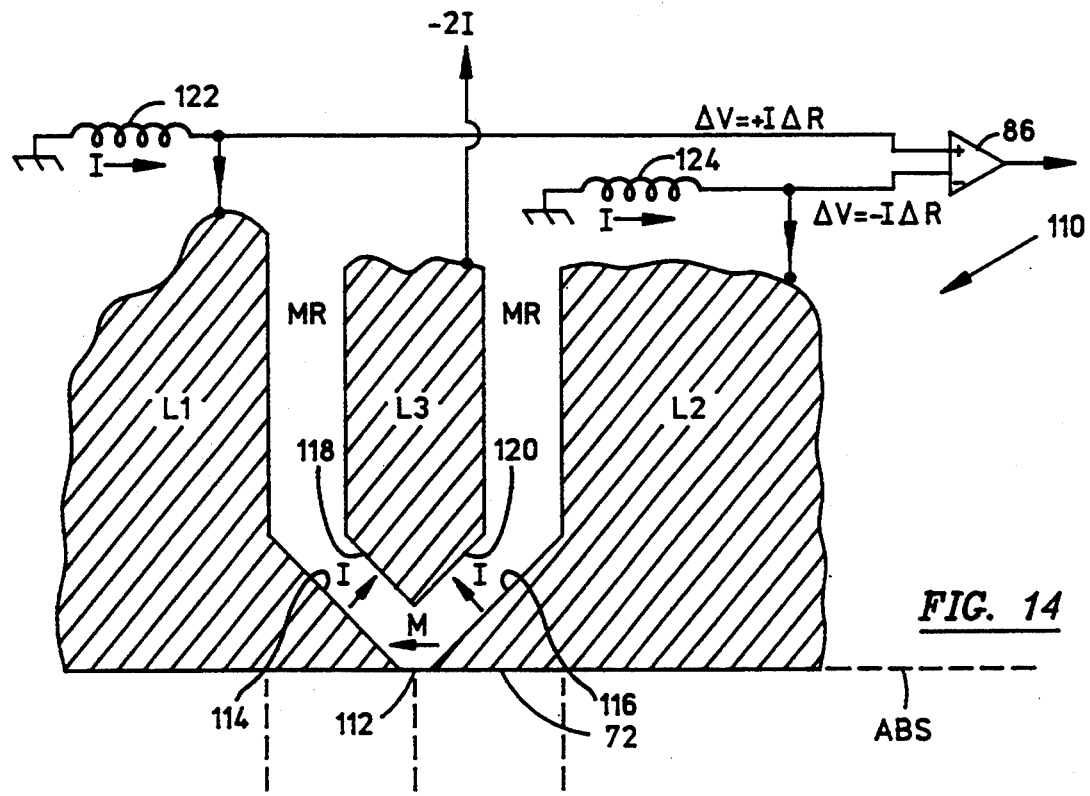
FIG. 14 is another embodiment of the invention similar to FIG. 3, except the first and second leads are connected to the MR stripe at its bottom edge and the third lead is connected to the MR stripe between the first and second leads.
Figure 15:
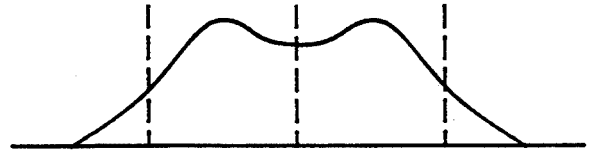
FIG. 15 is a micro track profile showing the signal response of the MR stripe of FIG. 14.
Figure 16:
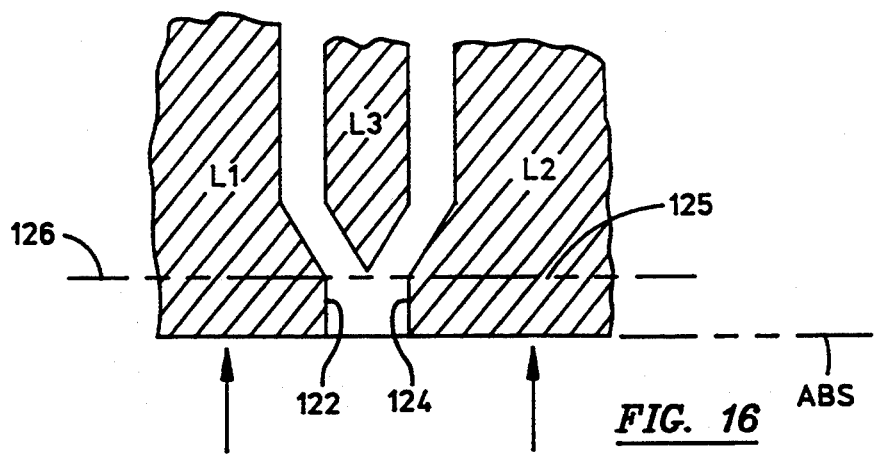
FIG. 16 is a schematic illustration of a construction technique for the FIG. 14 embodiment which preserves the distance between the first and second leads during a lapping operation.

FIG. 14 illustrates a different arrangement of the first, second, and third leads L1, L2 and L3 with respect to the MR stripe. The embodiment 110 connects the first and second leads L1 and L2 to the bottom edge 72 of the MR stripe in a spaced-apart relationship shown at 112. The first lead L1 has a straight edge 114 and the second lead L2 has a straight edge 116. Positioned between the first and second leads L1 and L2 is the third lead L3 in a spaced-apart relationship with respect to the first and second leads L1 and L2. The third lead L3 has first and second straight edges 118 and 120. The first and second leads L1 and L2 are connected to ground via inductors 122 and 124. The third lead L3 is supplied with a current source -2I. A current I will then flow from the straight edge 114 of the first lead L1 to the first straight edge 118 of the third lead L3, and a current I will flow from the straight edge 116 of the second lead L2 to the second straight edge 120 of the third lead L3. These currents I will be the same in magnitude when the transducer is in a quiescent state (when no magnetic flux incursion is received from a magnetic medium). The differential preamplifier 86 is connected across the first and second leads L1 and L2 and will detect a potential difference when there is a magnetic flux incursion from a magnetic medium (not shown) below the ABS which causes the magnetization vector M in the MR stripe to rotate. While the embodiment 110 illustrates that the arrangement of the leads can be reversed, this embodiment is not immune to shorting across the first and second leads L1 and L2 between the space 112 at the ABS due to the AC signal thereacross. For this reason, the previous embodiments are preferred. An arrangement for constructing the embodiment 110 is illustrated in FIG. 16. The first and second leads L1 and L2 are constructed in a perpendicular relationship 122 and 124 with respect to the ABS. Accordingly, when the transducer is lapped no further than the line 126, the distance between the first and second leads L1 and L2 at the ABS will be maintained.

Obviously many modifications and variations of the present invention are possible in light of the above teachings. It is therefore to be understood that, within the scope of the appended claims, the invention may be practiced other than as specifically described.

We claim:

1. An MR read transducer comprising:
   an elongated MR stripe having a longitudinal axis which is located between top and bottom edges;
   first and second leads connected to the MR stripe along one of its edges in a spaced apart relationship and a third lead connected to the MR stripe along its other edge;
   each of the first and second leads having an edge and the third lead having first and second edges, all of the edges being spaced from one another;
   the edge of the first lead and the first edge of the third lead being in a spaced apart relationship facing one another along an angle $\alpha$ to the longitudinal axis of the MR stripe; and
   the edge of the second lead and the second edge of the third lead being in a spaced apart relationship facing one another along an angle $\beta$ to the longitudinal axis of the MR stripe.

2. A disk drive including the MR read transducer as claimed in claim 1, the disk drive including:
   a spindle for rotating a magnetic disk; and
   the spindle being grounded.

3. An MR read transducer as claimed in claim 1 including:
   first and second shield layers constructed of NiFe;
   the MR stripe being located between the first and second shield layers;
   any of the leads connected to the MR stripe along the bottom edge being connected to one of the shield layers; and
   the first and second shield layers being grounded.

4. An MR read transducer as claimed in claim 1 including:
   the angles $\alpha$ and $\beta$ being substantially equal.

5. An MR read transducer as claimed in claim 4 including:
   each of the angles $\alpha$ and $\beta$ being substantially 45 degrees;
   the edges of the first and second leads extending substantially 90 degrees with respect to one another; and
   the first and second edges of the third lead extending substantially 90 degrees with respect to one another.

6. An MR read transducer as claimed in claim 1 including:
   the MR stripe having first and second film surfaces which are bounded in part by the top and bottom edges; and the leads being flat strips which are mounted to the first film surface and the edges of the leads being within a boundary of the first film surface.

7. An MR read transducer as claimed in claim 1 including:
sensing circuit means connected to the first, second and third leads for applying a sense current between the first and third leads and for applying a sense current between the second and third leads; and
the current in the first and third leads and the current in the second and third leads being substantially equal.

8. An MR read transducer as claimed in claim 7 including:
the sensing circuit means including a differential preamplifier which is connected across the first and second leads.

9. An MR read transducer as claimed in claim 8 including:
servo circuit means including a summing preamplifier which is connected across the first and second leads.

10. A disk drive including the MR read transducer as claimed in claim 9, the disk drive including:
a disk supported below the bottom edge of the MR stripe; and
the disk having a circular track which carries information and servo data.

11. A disk drive as claimed in claim 10 including:
the track having first and second spaced apart edges; and
the servo data comprising a pulse which extends from the first edge of the track to the second edge of the track.

12. An MR read transducer as claimed in claim 1 including:
the first and second leads being connected to the MR stripe along the top edge of the MR stripe;
the third lead being connected to the MR stripe along the bottom edge of the MR stripe; and
the bottom edge of the MR stripe extending along an air bearing surface of the MR transducer.

13. An MR read transducer as claimed in claim 1 including:
the first and second leads being connected to the MR stripe along the bottom edge of the MR stripe;
the third lead being connected to the MR stripe along the top edge of the MR stripe; and
the bottom edge of the MR stripe extending along an air bearing surface of the MR transducer.

14. An MR read transducer as claimed in claim 1 including:
the MR stripe being biased along its longitudinal axis.

15. An MR read transducer as claimed in claim 14 including:
means for hard biasing the MR stripe along its longitudinal axis.

16. An MR read transducer as claimed in claim 1 including:
any leads connected to the MR stripe along the bottom edge being grounded.

17. An MR read transducer as claimed in claim 16 including:
first and second shield layers constructed of NiFe;
the MR stripe being located between the first and second shield layers;
any of the leads connected to the MR stripe along the bottom edge being connected to one of the shield layers; and
the first and second shield layers being grounded.

18. An MR read transducer as claimed in claim 17 including:
the angles $\alpha$ and $\beta$ being substantially equal.

19. An MR read transducer as claimed in claim 18 including:
each of the angles $\alpha$ and $\beta$ being substantially 45 degrees;
the edges of the first and second leads extending substantially 90 degrees with respect to one another; and
the first and second edges of the third lead extending substantially 90 degrees with respect to one another.

20. An MR read transducer as claimed in claim 19 including:
sensing circuit means connected to the first, second and third leads for transmitting a sense current between the first and third leads and for transmitting a sense current between the second and third leads; and
the current in the first and third leads and the current in the second and third leads being substantially equal.

21. An MR read transducer as claimed in claim 20 including:
the MR stripe having first and second film surfaces which are bounded by the top and bottom edges; and
the leads being flat strips which are mounted to the first film surface and the edges of the leads being within a boundary of the first film surface.

22. An MR read transducer as claimed in claim 21 including:
the sensing circuit means including a differential preamplifier which is connected across the first and second leads.

23. An MR read transducer as claimed in claim 22 including:
servo circuit means including a summing preamplifier which is connected across the first and second leads.

24. An MR read transducer as claimed in claim 23 including:
a disk supported below the bottom edge of the MR stripe; and
the disk having a circular track which carries information and servo data.

25. An MR read transducer as claimed in claim 24 including:
the track having first and second spaced apart edges; and
the servo data comprising a pulse which extends from the first edge of the track to the second edge of the track.

26. An MR read transducer as claimed in claim 25 including:
the first and second leads being connected to the MR stripe along the top edge of the MR stripe;
the third lead being connected to the MR stripe along the bottom edge of the MR stripe; and
the bottom edge of the MR stripe extending along an air bearing surface of the MR transducer.

27. An MR read transducer comprising:
an elongated MR stripe which has a longitudinal axis;

the MR stripe having first and second film surfaces which are bounded in part by top and bottom edges;

first and second conductive strips connected to the first film surface in a spaced apart relationship and extending from one of the edges of the MR stripe toward said longitudinal axis;

a third conductive strip connected to the first film surface and extending from the other edge of the MR stripe toward said longitudinal axis;

any conductive strip connected to the MR stripe along said bottom edge being grounded;

each of the first and second conductive strips having a substantially straight edge and the third conductive strip having first and second straight edges;

the straight edge of the first conductive strip and the first straight edge of third conductive strip being spaced from one another in a substantially parallel relationship and facing one another along a line which is at an angle $\alpha$ to the longitudinal axis of the MR strip;

the straight edge of the second conductive strip and the second edge of the third conductive strip being spaced from another in a substantially parallel relationship and facing one another along a line which is at an angle $\beta$ to the longitudinal axis of the MR strip; and means for hard biasing the MR stripe along its longitudinal axis.

28. A disk drive including the MR read transducer as claimed in claim 27, the disk drive including:
a spindle for rotating a magnetic disk; and
the spindle being grounded.

29. An MR read transducer as claimed in claim 27 including:
first and second shield layers constructed of NiFe;
the MR stripe being located between the first and second shield layers:
any of the leads connected to the MR stripe along the bottom edge being connected to one of the shield layers; and
the first and second shield layers being grounded.

30. An MR read transducer as claimed in claim 29 including:
the angles $\alpha$ and $\beta$ being substantially equal;
sensing circuit means connected to the first, second and third leads for transmitting a sense current between the first and third leads and for transmitting a sense current between the second and third leads; and
the current in the first and third leads and the current in the second and third leads being substantially equal.

31. A disk drive including the MR read transducer as claimed in claim 30, the disk drive including:
the sensing circuit means including a differential preamplifier which is connected across the first and second leads;
servo circuit means including a summing preamplifier which is connected across the first and second leads;
a disk supported below the bottom edge of the MR stripe;
the disk having a circular information track;
the track also containing servo data;
the track having first and second spaced apart edges; and
the servo data comprising a pulse which extends from the first edge of the track to the second edge of the track.

32. A disk drive as claimed in claim 31 including:
each of the angles $\alpha$ and $\beta$ being substantially 45 degrees;
the edges of the first and second conductive strips extending substantially 90 degrees with respect to one another; and
the first and second edges of the third conductive strip extending substantially 90 degrees with respect to one another.

33. A disk drive as claimed in claim 32 including:
the first and second conductive strips being connected to the MR stripe along the top edge of the MR stripe;
the third conductive strip being connected to the MR stripe along the bottom edge of the MR stripe; and
the bottom edge of the MR stripe extending along an air bearing surface of the MR transducer.

34. A disk drive as claimed in claim 32 including:
the first and second leads being connected to the MR stripe along the bottom edge of the MR stripe;
the third lead being connected to the MR stripe along the top edge of the MR stripe; and
the bottom edge of the MR stripe extending along an air bearing surface of the MR transducer.

* * * * *